US012786487B2

(12) United States Patent
Friend et al.

(10) Patent No.: US 12,786,487 B2
(45) Date of Patent: Nov. 3, 2026

(54) CONTENT MODIFICATION SYSTEM AND METHOD

(71) Applicant: Sony Interactive Entertainment Inc., Tokyo (JP)

(72) Inventors: Mark Friend, London (GB); Maria Chiara Monti, London (GB); Christopher George Buchanan, London (GB); Mandana Jenabzadeh, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/424,985

(22) Filed: Jan. 29, 2024

(65) Prior Publication Data

US 2024/0267572 A1 Aug. 8, 2024

(30) Foreign Application Priority Data

Feb. 2, 2023 (GB) ...................................... 2301493

(51) Int. Cl.

| | |
|---|---|
| ***H04N 21/234*** | (2011.01) |
| ***H04L 67/306*** | (2022.01) |
| ***H04N 21/442*** | (2011.01) |
| ***H04N 21/81*** | (2011.01) |

(52) U.S. Cl.

CPC ......... *H04N 21/234* (2013.01); *H04L 67/306* (2013.01); *H04N 21/44218* (2013.01); *H04N 21/8106* (2013.01)

(58) Field of Classification Search

None

See application file for complete search history.

(56) References Cited

U.S. PATENT DOCUMENTS

| | | | |
|---|---|---|---|
| 2014/0150002 | A1 | 5/2014 | Hough |
| 2015/0302894 | A1 | 10/2015 | Boiman |
| 2016/0063883 | A1 | 3/2016 | Jeyanandarajan |
| 2017/0223413 | A1 | 8/2017 | Kozloski |

(Continued)

FOREIGN PATENT DOCUMENTS

| | | |
|---|---|---|
| GB | 2612845 A | 5/2023 |

OTHER PUBLICATIONS

Combined Search and Examination Report for corresponding GB Application No. 2301493.9, 12 pages, dated Jul. 27, 2023.

(Continued)

*Primary Examiner* — Omar S Parra

(74) *Attorney, Agent, or Firm* — Kilpatrick Townsend & Stockton LLP

(57) ABSTRACT

A system for modifying the presentation of pre-generated content to a user, the system comprising a user focus determination unit configured to determine a level of user focus in respect of at least a portion of content being displayed to the user, a user profile obtaining unit configured to obtain a user profile indicating one or more characteristics of the user, a content modification unit configured to modify, in response to a determination of the level of user focus falling below a threshold value, the presentation of one or more portions of the pre-generated content to increase the level of user focus, wherein the modification is determined in dependence upon the obtained user profile.

12 Claims, 3 Drawing Sheets

(56) References Cited

U.S. PATENT DOCUMENTS

| | | | | |
|---|---|---|---|---|
| 2019/0147760 | A1* | 5/2019 | Bruckner | G06N 20/00 706/11 |
| 2020/0298100 | A1 | 9/2020 | Ambinder | |
| 2021/0076090 | A1 | 3/2021 | Aimone | |
| 2021/0082300 | A1* | 3/2021 | Silverstein | G06F 3/011 |
| 2023/0162613 | A1* | 5/2023 | Asgekar | G09B 7/00 434/350 |
| 2023/0325611 | A1* | 10/2023 | Garg | G06F 40/58 |
| 2024/0139462 | A1* | 5/2024 | Lal | A63F 13/79 |
| 2024/0223780 | A1* | 7/2024 | Kim | G06T 7/11 |
| 2024/0251134 | A1* | 7/2024 | Younessian | H04N 21/2407 |

OTHER PUBLICATIONS

Extended European Search Report for corresponding EP Application No. 24152573.2, 8 pages, dated May 3, 2024.
EP24152573.2, “Office Action”, May 6, 2026, 7 pages.
GB2301493.9, “First Examination Report”, Jun. 30, 2026, 7 pages.

* cited by examiner

300

400

500

CONTENT MODIFICATION SYSTEM AND METHOD

BACKGROUND OF THE INVENTION

Field of the Invention

This disclosure relates to a content modification system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With increases in the capabilities of processing and display devices have come increasingly immersive user experiences, such as video games with advanced graphics and video content having a more realistic display. In accordance with this, the expectations of users have increased in respect of the expected level of engagement with content. This may extend beyond the appearance of the content, so as to include both their interactions with the content (leading to more intuitive inputs, for instance) and the form of the content itself (such as how and which events occur). This can lead to challenges in providing engaging content for users, as a number of these other considerations may be more user-specific and as such a single approach is not effective to ensure an engaging and immersive experience for all users.

However, particularly in the case of pre-generated content (such as video game cut scenes or pre-recorded video content), it can be difficult to tailor content to each of the users consuming the content. This may be due to constraints upon the information that needs to be conveyed; for instance, tailoring a movie for each different viewer can cause problems if this leads to each viewer experiencing contrasting plots. It is also considered that this would require a significant burden upon the content creators in generating the different versions, both in terms of content creation and the processing and storage of that created content. The distribution of this content may also be challenging, as distributing a number of different versions would likely be less efficient than a larger distribution of a single version of the content.

It is therefore considered that it is challenging to provide content which is engaging for users without introducing an undue burden upon content creators and the associated content generation and/or distribution processing.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
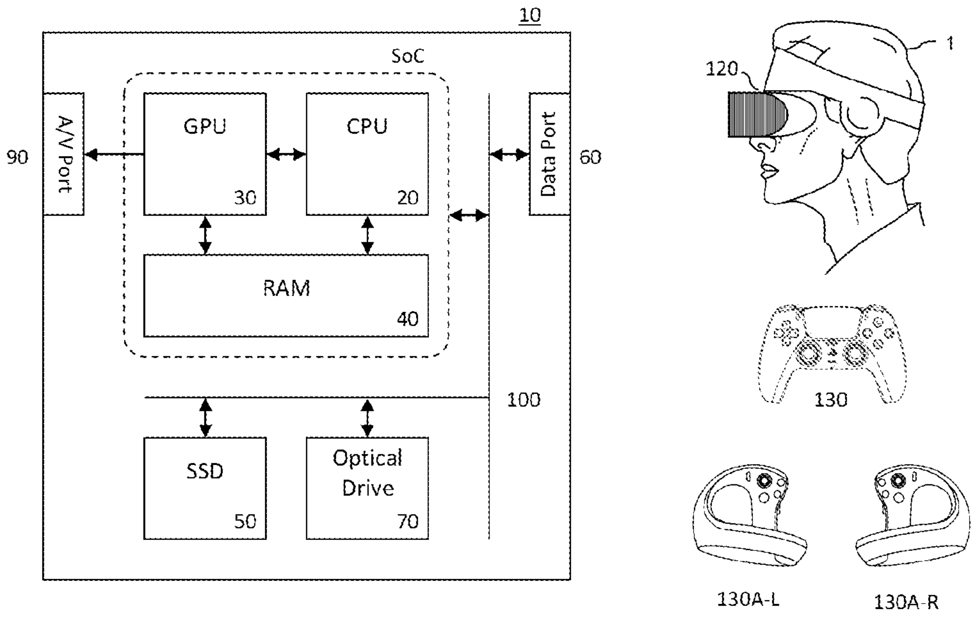
FIG. 1 schematically illustrates an example of an entertainment system.

Referring now to the drawings, wherein like reference numerals designate identical or corresponding parts throughout the several views, embodiments of the present disclosure are described.

Referring to FIG. 1, an example of an entertainment system 10 is a computer or console such as the Sony® PlayStation 5® (PS5). This is an example of a processing device that may be configured to implement one or more of the techniques described in this disclosure; alternatively, or in addition, one or more additional processing systems may be provided to perform processing for implementing the described techniques. One example of such a processing system is that of a remote server in a cloud-computing arrangement, which may be in communication with the entertainment system 10 via a network connection such as the internet.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment system is a head mounted display 'HMD' 120, such as the PlayStation VR 2 'PSVR2', worn by a user 1.

Where components are not integrated, they may be connected as appropriate either by a dedicated data link or via a bus 100.

Interaction with the system is typically provided using one or more handheld controllers (130, 130A), such as the DualSense® controller (130) in the case of the PS5, and/or one or more VR controllers (130A-L,R) in the case of the HMD. One or more sensors may be provided to enable interaction with the system by a user, such as accelerometers in a controller for tracking user motion in respect of that controller, as well as measuring the state of a user (such as biometric sensors integrated with the HMD or controllers).

The present disclosure relates to the presentation of content to a user in a manner that is suited to their particular preferences whilst not resulting in an excessive computational or content creation/distribution burden. The content may be any content comprising pre-generated (that is, scripted or otherwise pre-recorded content); for example, television programmes, video games (in which pre-generated content can include cut scenes), and movies. The content may therefore comprise either entirely pre-generated content which is to be presented to the user as-is, or a combination of this with interactive content in which images are generated in response to user inputs (such as controlling a character in a game).

Here, pre-generated content refers to any content that is not generated on-the-fly in response to user inputs; in the case of video games, this includes cut-scenes which are pre-scripted and/or pre-rendered. It is considered that in some cases video game cut-scenes may be rendered in response to a particular user's appearance, but the content may be considered to be pre-generated as it is only the appearance of a model that changes whilst the events of the scene are maintained. In some cases, pre-generated content may be considered to be any content that does not feature a user-controlled element (such as an avatar or game character) that is able to interact with elements within the content. Therefore pre-generated content may be able to be interacted with (for instance, with a user being able to select a particular response in dialogue), but only to the degree that the interaction is used to determine which pre-generated content should be presented to the user.

In particular, the suitability of the content for a user is determined based upon their level of focus in respect of the content; a user that is not paying attention to the content may be bored, for example, or having difficulty following what is happening, and as such the content may be seen as being unsuitable. The level of user focus may be determined in response to the content as a whole, or a specific part of the content (such as a particular element in a displayed image). In response to this, modifications can be made to the content which are expected to increase the level of user focus; examples include increasing the speed of presentation, adding and/or removing segments of the content, and modifying audio outputs.

These modifications can be performed in an iterative manner, for instance by changing the content and then re-measuring user focus to identify whether the modification was successful and/or whether further modifications are required. Alternatively, or in addition, the modifications may be based upon a user profile which is indicative of preferred modifications or user responses to particular modifications. For instance, a profile may indicate that a user is uninterested in dialogue and in response to this the content may be modified to reduce the amount of dialogue. Similarly, a profile may indicate that a user struggles to follow dialogue; in this case, extra lines may be added which clarify events, or the presentation speed may be reduced to give a user more time to process the content.

Figure 2:
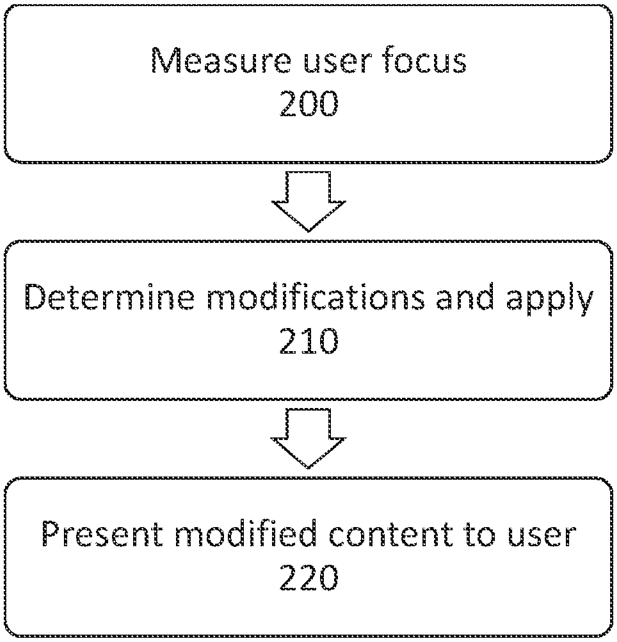
FIG. 2 schematically illustrates a method for modifying pre-generated content.

FIG. 2 schematically illustrates a method for implementing one or more of the techniques of the present disclosure. More specifically, the method of FIG. 2 is a method for modifying pre-generated content in response to the determination of a below-threshold level of focus by a user. The content may comprise any combination of audio and/or video content as appropriate, and may correspond to any suitable type of content—examples include podcasts, movies, television programmes, and cut-scenes in video games.

A step 200 comprises measuring a level of user focus in respect of the content being presented, or an element of that content. It should be considered that this may not be the same part of the content that is modified; for instance, the level of focus on one or more elements during interactive gameplay may be used to modify the presentation of pre-generated content at another time (such as a following cut scene). A level of user focus may be binary (high or low), or may be determined on a more precise scale (such as a score from 1-5, with 5 indicating the highest level of focus); however, any suitable scale may be used, with a separate level of focus being determined for different elements in the content where appropriate.

The level of user focus may be determined based upon input from any suitable sensors. For instance, gaze tracking may be used to ascertain whether the user is viewing a display screen area or not (with a user not viewing the display being considered to have a lower degree of focus). Similarly, a level of focus may be determined in dependence upon an amount of motion of the user's gaze—a user who changes their gaze location more frequently may be considered to have a lower level of focus upon the content. In addition to this, gaze tracking may be used to identify a particular element being displayed that is being focused upon by the user, with the level of focus being determined based upon inputs from other sensors and/or from a duration of the user's gaze upon that object (for example).

Other examples of sensors that can be used to determine user focus include heart rate monitors, galvanic skin response sensors, motion sensors, microphones for detecting utterances by the user (including the detection of sounds being made and/or the semantic content of the utterances), and inputs (such as button presses) from a controller being operated by the user. The outputs of each of these optional sensors may be considered in isolation or in combination as appropriate, and the selection/weighting of the sensor outputs in determining user levels of focus may be further dependent upon a user profile or the like which indicates a correlation between measurements and focus for a particular user or group of users.

While in some cases the correlation between sensor readings and a level of user focus can be determined in isolation (such as a low heart rate being indicative of a low rate of user focus, particularly during exciting content), it may be advantageous to perform a calibration process or otherwise develop a model which links sensor readings to determinations of levels of user focus. An example of a calibration is one in which a user views one or more predetermined videos, and the sensor readings are compared to an expected response from the user (such as a reference level of focus from a cohort of similar users) and/or a user's own feedback on which parts of the video or videos they found interesting (or other measures of engagement or interest).

A step 210 comprises the determination of one or more modifications to pre-generated content in the case that the measured level of user focus is lower than a threshold value. As with the determination of a level of user focus, this may be performed in dependence upon a user profile (either user specific, or representing a group of users) which indicates the effectiveness of different modifications in increasing the level of user focus, or some other indication of user preferences for the content modification.

These modifications may include any suitable changes to the pre-generated content so as to increase the level of user focus; this increased level of user focus can include making the pre-generated content more engaging, or it may simply include reducing the duration of the pre-generated content so as to allow a user to return to an interactive or otherwise more engaging portion of the content more quickly. For instance, by reducing the length of a cut scene in a video game the user is able to continue with the gameplay more quickly, thereby increasing the level of user focus with respect to the content (even if the level of focus with respect to the modified portion itself has not been increased).

Examples of modifications include the changing of the playback speed of the pre-generated content, the addition, substitution, and/or removal of portions of the pre-generated content, the modification of audio associated with the pre-generated content, the implementation of subtitles or other visual enhancements, and/or the generation of a condensed version of the pre-generated content. These may be implemented in any suitable combination of modifications, rather than being limited to only implementing a single modification for the content. Examples of the implementation of a number of these modification options are discussed in more detail below.

The determination of which modifications to apply can be based upon a user's profile which indicates factors or modifications that are correlated with increased levels of user focus. This profile can be based upon user inputs indicating particular data; for instance, a user may indicate how interested they are in dialogue or other events within content, or indeed particular elements, so as to enable a determination of how focused a user is likely to be upon those events. A user could also indicate their interest in side quests versus a main storyline in games, for instance.

Alternatively, or in addition, a profile may be built up based upon a calibration process in line with that described above with reference to step 200. For instance, a user's level of focus may be measured while viewing reference pre-generated content with the changes to the level of user focus being monitored in response to modifications to the pre-generated content. The use of reference pre-generated content may be beneficial in this case as it allows the events within the content to be known and therefore accounted for when determining whether a change in the level of user focus is due to the modifications being applied or due to the viewing of a different portion of the reference content.

It is further considered that a user profile may include information that differs on a per-game, per-genre, per-time-of-day, or indeed any other basis; each of these may be considered relevant to the determination of which modifications should be applied. For instance, a user may be happy for dialogue to be cut in a comedy film (in which details the storyline may be less relevant for enjoyment) relative to a drama film in which the smaller details may be more relevant. Similarly, a user may be less responsive to changes in playback speed during the day when they are more awake relative to playing a game late at night in which the user's tiredness may make it harder to follow sped-up content.

A step 220 comprises presenting the modified version of the pre-generated content to the user.

This may be via any suitable display device, such as a television, mobile phone, mobile games console, and/or HMD. In the case that the content is audio-only, then the modified version of the pre-generated content may be output using a device with a speaker arrangement only—the provision of a display at the output device may be optional.

While shown here as a linear process with clearly distinct steps, it is considered that implementations may instead adopt a more dynamic approach in which the modifications are determined on-the-fly in response to a determined level of user focus in respect of the modified version of the pre-generated content. In this manner, the pre-generated content can be modified whilst being presented to the user in response to a live measurement of the user's level of focus. Similarly, responses of a user to particular modification (in respect of the determined level of user focus) may be tracked so as to update the user's profile; this can then be used to inform future modifications to content.

Figure 3:
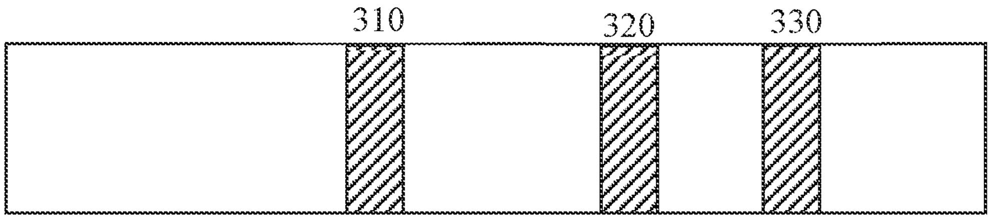
FIG. 3 schematically illustrates an example of a single-file format for the pre-generated content.
Figure 4:
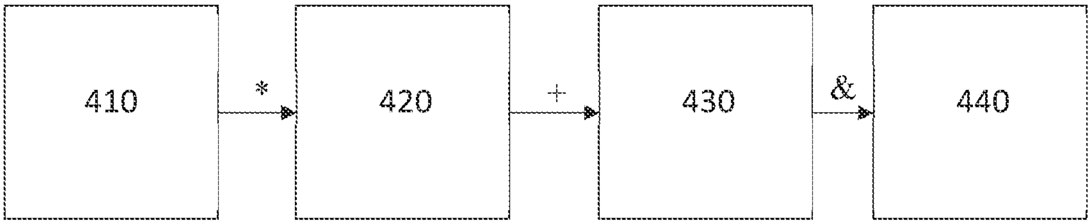
FIG. 4 schematically illustrates an alternative format in which the pre-generated content is provided in a plurality of segments.
Figure 5:
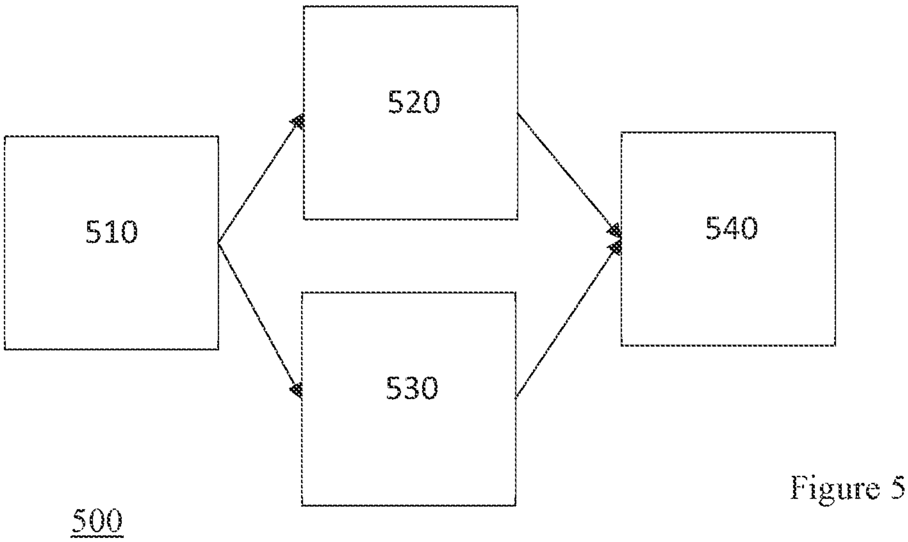
FIG. 5 schematically illustrates another segment-based approach to providing the pre-generated content.

FIGS. 3-5 schematically illustrate a number of examples of the format of the pre-generated content; these may each be representative of a cut-scene in a game or an episode of a television programme, for instance.

FIG. 3 schematically illustrates an example of a single-file format for the video; an example is a video in which the entirety of the video is encoded in a single stream or video file. In such a case the determined modifications are applied to the pre-generated content directly; for instance the video 300 may comprise a modification at 310 to increase the speed of a scene or a portion of the scene (such as to fast-forward a conversation). The modifications 320 may involve the cutting of a portion of the video—for instance, removing the beginning and end of a conversation while preserving the middle portion (which comprises the more salient information in this example). Meanwhile, the modifications 330 may include the provision of additional content (such as additional pre-generated portions or newly-generated portions) so as to increase the duration of the content.

FIG. 4 schematically illustrates an alternative format in which the pre-generated content 400 is provided in a plurality of segments 410, 420, 430, 440. The first of these segments 410 is presented without modification whilst measurements of the user's focus are made. In response to these measurements, denoted by the *, the second segment 420 is modified. Similarly, the third and fourth segments 430 and 440 may be modified in dependence upon measurements of user focus made during the presentation of the segments 420 and 430 respectively (represented by the + and & signs respectively). Such an approach may enable a more efficient modification of the content due to the modifications being made to pre-defined portions of content.

While shown as being cumulative here, it is considered that the measurements of the level of user focus may be propagated throughout the pre-generated content in any suitable manner—for instance, if the same characters appear in segments 410 and 440, but not 420, then the segment 440 may be modified in dependence upon the measurements * and & (and not +, as this relates to neither common characters nor a preceding segment). In some cases, the focus measurements may be tied to specific elements within the content. Alternatively, or in addition, the measurements may be applied to the next segment only so as to reduce the elapsed time between a measurement of the level of user focus and a modification being applied in dependence upon that measurement.

FIG. 5 schematically illustrates another segment-based approach to providing the pre-generated content. In this example, a number of pre-generated segments may be provided that correspond to a single segment position. In this example, the content 500 comprises a first segment 510, a pair of second segments 520 and 530, and a third segment 540. The pair of second segments 520 and 530 are selected between based upon a level of user focus as measured before and/or during the playback of the first segment 510.

The pair of second segments 520 and 530 are considered to comprise largely the same semantic content, but presented in a different manner—this can lead to the segments having different durations, in some cases. For instance, the segments may comprise the same content with a different playback speed, or one of the segments may be a condensed version of the other such that less-relevant content (such as small talk in a conversation) may be omitted. Other examples of differences include that one may comprise subtitles where the other does not, and/or one may have processed audio to provide a different overall impression to a viewer.

Of course, each of these segments may also be modified in addition to the modifications applied as a part of the pre-generation process. This additional modification may also be made in response to measurements of user focus; for instance, if a user is shown to have a significant lack of focus, then a selection of a segment corresponding to this scenario (such as a segment with dialogue omitted) may be selected, and then this segment may be modified further so as to increase the speed due to the notably low level of user focus.

While the above discussion focuses largely on the concept of removing or speeding up portions of the pre-generated content, it is also considered that the same principles can apply to the addition of content or the slowing down of the content. This can enable a user who is particularly focused to experience the content in a more complete manner, such as by inserting pre-generated additional portions in predetermined locations which provide more detail about the events unfolding within the pre-generated content or the context in which the events occur. It is also considered that the slowing down of the content may assist with a user's comprehension of the content, particularly those viewing content in a second language or the like.

To aid the modification of the pre-generated content (independent of the format of the pre-generated content), additional data may be provided in the form of metadata or the like. This data may be used to indicate which portions of the content are particularly suited for modification. In some cases the additional data may be provided in respect of a particular modification (such as highlighting specific portions of the content that are suitable for the application of a particular modification); alternatively, or in addition, additional data may indicate one or more properties of the pre-generated content at a particular time so as to aid the determination of which modifications to apply and to which portions. Any amount of additional data may be provided in any suitable combination; it is not required that only one set of additional data is provided.

In a first example, metadata may be provided which indicates portions of the pre-generated content which are particularly suitable for an increase in playback speed—this may include portions which have little dialogue or motion, for instance, and as such the increase in playback speed may be less noticeable and/or have less of an impact upon the user's understanding of the content (as fast-forwarding speech may lead to difficulties with comprehension of the speech).

In another example, metadata may be provided which indicates a saliency of one or more frames or elements within the pre-generated content; this may be useful for determining which portions of the pre-generated content can be omitted without significant impact upon the scene.

Another example is that of an element presence indicator which is used to identify which elements, such as particular objects or characters, are present in the pre-generated content at a particular time. This may be particularly suitable when the user's level of focus has been found to correlate with particular elements, as well as in determining whether particular segments are viable for modification based upon knowledge of which elements are most relevant to the pre-generated content.

In a further example, evaluation of the content may be performed to identify one or more attributes; an example of this is the presence of audio, with a quieter frame (or a frame without speech) being likely to be a more suitable candidate for modification due to a lower likelihood of salient information being lost. Similarly, processing may be performed to identify an amount of motion (with static frames being likely to comprise less salient information) or any other parameter which may correlate with the likelihood of a modification being able to be performed without the loss of particularly salient information.

Saliency may be determined in respect of any particular metric. In some cases, a saliency may be defined on a per-frame or per-segment basis by a content creator. Alternatively, or in addition, particular elements within the content may be identified as being of particular importance (such as a main character in content being considered more important than a peripheral character), or a list of keywords or the like may be provided which can be used to determine the importance of dialogue. Saliency may also be inferred from processing the content to identify characteristics associated with saliency; for instance, an amount of motion in video frames or the like may be tracked (with more/less motion being indicative of saliency in dependence upon the content itself).

While in some cases information such as that of the above examples may be provided by a content creator or the like, in other cases a trained machine learning model may be used to evaluate content to identify which portions are able to be accelerated or omitted (or otherwise modified). This may be performed as a part of the content creation process, or may be performed by a device associated with the content playback.

A machine learning model may be trained in any suitable manner for such a purpose; in some implementations a model may be trained using training data which includes original and modified versions of the same content for a suitable number of samples of content. In this case, the omitted or modified portions of the content can be analysed to determine common characteristics which can therefore be considered to correlate with suitability for modification. The model can then be tested upon samples of content to determine whether the output modified content is suitable—this may be determined by a human input indicating the quality of the output modified content (for instance, in respect of the amount of salient information preserved and/or how apparent the modifications are) for example. Feedback from this process may then be used to refine the machine learning model as appropriate.

Alternatively, or in addition, a machine learning model may be trained upon specific modifications considerations. For instance, a machine learning model may be trained to perform modifications that are not particularly noticeable (such as not cutting a clip halfway through speech), which can result in a seamless modified content being output. Similarly, a machine learning model may be trained to provide a similar effect for audio—this may be particularly useful for avoiding jarring transitions in respect of background audio or the like.

Another manner of training a machine learning model includes training for the effective condensation of speech. Without a specific consideration of this, the modification of content may lead to salient information being omitted, lost nuance, monologues (if only one character's speech is cut), and/or non-sequiturs. Examples of training data include scripts that have been condensed by human input alongside the original scripts, copies of news articles and the like which have been condensed, and comparisons of dialogue in a book and a corresponding movie scene.

In a similar use case, a machine learning model may be trained to generate additional dialogue for a scene so as to enable it to be extended or for more detail to be added on the fly. This can be combined with a content creation engine (such as a game engine) which can generate video content to match the dialogue that is generated—including animations for characters limbs and lip synching for their speech, for example.

While the modifications above have largely been described with reference to adding/removing content or changing a playback speed, it is also considered that other modifications may be considered in response to a particular measurement of user focus.

One example of this is to modify the audio so as to remove accents, or to generate new audio (such as from a script associated with the content) which is in a different or neutral accent. This may increase the ability of a user to understand what is happening in the content, which may thereby increase their level of focus. A similarly suitable modification may be the changing of the language that is used; this can include a translation to a foreign language (audio-to-audio, or translating a script to use as an input to a speech synthesising application) or a simplification of language (such as reducing the use of slang, long words, or obscure words). This can be achieved using a standardised thesaurus, for instance, which identifies simplified language that can be substituted in for the original wording that is used in the content.

Another audio modification process is that of normalising the volume so as to ensure that the audio is at a relatively consistent loudness. This may be advantageous in the case that some audio is too quiet, which can cause a user to lose focus if they are not able to hear certain sounds. Both of these may also be performed in response to a determination of a higher-than-expected level of focus, as this may indicate a problem with the user's comprehension—a user may exhibit a higher degree of focus when straining to hear audio or to understand speech, for instance.

Another example is to modify the video so as to change to overall visual impression upon a user. This can include enhancing particular colours, varying parameters such as contrast or brightness, or removing colour altogether. Other modifications can include changing a viewpoint, zooming in or out, adding highlighting effects to certain objects (such as highlighting a person who is speaking), or any other modification.

Figure 6:
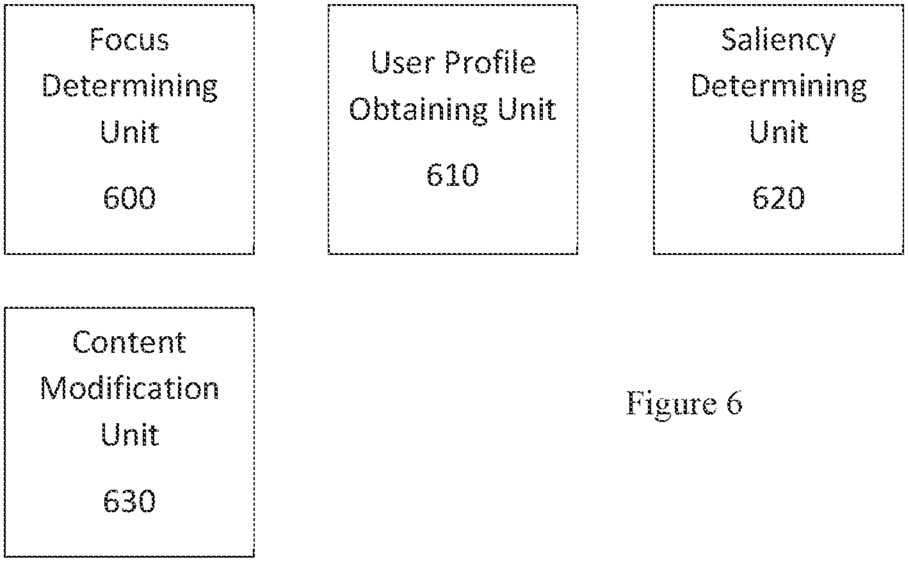
FIG. 6 schematically illustrates a system for modifying the presentation of pre-generated content to a user.

FIG. 6 schematically illustrates a system for modifying the presentation of pre-generated content to a user. The system comprises a user focus determination unit 600, a user profile obtaining unit 610, an optional saliency determining unit 620, and a content modification unit 630. Each of these functional units may be implemented using one or more processing units such as the CPA 20 and GPU 30 of the entertainment device 10 of FIG. 1; any other arrangement may also be considered, including those in which the functionality is distributed amongst a number of devices (such as a client and server).

Reference is made to the modification of portions of pre-generated content; these portions may be any suitable subset of the content such as a number of frames, a particular segment of a video, a scene, an event, or any other portion. The pre-generated content may be any audio and/or video content, such as podcasts, movies, or television programmes. In some implementations, the pre-generated content may be a cut-scene in a video game or any other pre-generated content (such as scripted interactions with a non-player character) within the game.

The user focus determination unit 600 is configured to determine a level of user focus in respect of at least a portion of content being displayed to the user. The user focus determination unit 600 may be configured to utilise any suitable inputs from which a user's level of focus can be derived or estimated; examples include biometric information, gaze tracking information, motion data, and/or audio inputs. In other cases, it may be the case that the level of user focus can be inferred or predicted based upon information about the content and/or user profile information, for instance saliency information for the content and/or elements of particular interest to a user (such as a favoured character or type of event).

The level of user focus may be determined in respect of a particular element within the content, such as a particular character or object, or may be determined in respect of one or more entire frames or segments of content (such as a group of frames or period of video). This determination may also (or instead) be made in dependence upon the audio; the focus need not be determined only on the basis of visual aspects of the content.

The user profile obtaining unit 610 is configured to obtain a user profile indicating one or more characteristics of the user. The user profile may be obtained from a local storage unit (such as a hard drive in a games console) or via a network connection—for instance if the user's profile is stored online. The user profile may include data identifying elements or content of particular interest to the user (or particular disinterest), such as characters, objects, events, genres, or any other aspect of a piece of content. In some implementations, the user profile may include information identifying the user's level of interest in side quests versus the main storyline in a game so as to indicate whether a user would likely be interested in content related to the side quests as a whole.

The user profile may also, or instead, indicate one or more physical characteristics of a user (or characteristics relating to a user's actions during the viewing of content) so as to assist with determining a level of user focus in a reliable manner. For instance, a resting heart rate may be stored in the user profile or a default measurement of galvanic skin response; similarly, a typical amount of user movement or audio output may be quantified.

Rather than being used only for the determination of the level of focus of the user, the user profile may also (or instead) comprise information about user preferences relating to the modification of content. For instance, a user's tolerance for viewing speed may be stored (such as an indication that a user is happy to view content at 1.5× the original speed but not 2× the original speed), and/or a user's tolerance for portions of content being omitted. The user profile may also indicate a user's preferences for a type of modification to be applied in response to a particular level of focus being detected; a user may prefer to view content at a higher speed rather than by having content removed from the playback, for instance, or a particular preference for audio to be modified to remove accents in speech may be indicated. Another preference of the user that may be indicated is that of which parts of the content should be modified; a user may have a particular desire to hear dialogue, for instance, and as such this type of content should not be modified where other types of content (that is, non-dialogue portions) would also be suitable for modification.

The user profile may further indicate the thresholds for user levels of focus leading to a modification being applied. This may be specified using any suitable scale or categorisation, or a deviation from a base level of focus exhibited by a user. These may be defined on a per-content, per-genre, and/or per-media basis, for example, or any other basis—this may be used to reflect that users naturally give some content more focus than other content, and as such the user may have a low level of focus by choice rather than because the content is deficient in some manner or because the user is unable to understand the content.

The optional saliency determining unit 620 is configured to determine a saliency score for one or more frames, elements, scenes, and/or portions of the pre-generated content. This feature may be considered optional in that the saliency need not be considered when determining whether to apply modifications to a particular portion; it may be considered that the modification is justified even if it does lead to the loss of salient information as if the user was not focused then they would have missed the information anyway.

A saliency score may be determined based upon metadata indicating the importance of particular objects within the content, for example, or a saliency map indicating important parts of an image frame. A saliency track may also (or instead) be provided which indicates a saliency value for image frames or other portions of the content. This may be advantageous in assisting with identifying which portions of the content to modify, as portions located with a low saliency (as indicated by the track, or identified due to not containing an element indicated as being of particular salience by the metadata) may be easily identified for modification.

The content modification unit 630 is configured to modify, in response to a determination of the level of user focus falling below a threshold value, the presentation of one or more portions of the pre-generated content to increase the level of user focus, wherein the modification is determined in dependence upon the obtained user profile. The dependency may include using the user profile to identify whether to apply a modification (for instance, by identifying the threshold), determining which modification is suitable, and/or determining the scale of the modification (such as the amount of an increase in the playback speed of content).

In some implementations, a modification that is applied by the content modification unit 630 comprises an increase in the playback speed of the pre-generated portions and/or the editing of a pre-generated portion so as to reduce its duration (for instance, by cutting a segment of the pre-generated portion). Alternatively, or in addition, the modification may comprise omitting one or more pre-generated portions during presentation of the content to the user.

Another option for applying the modification includes a selection of portions of the pre-generated portions to be presented to the user, wherein the portions include a plurality of portions representing alternatives to one another. An example of this is discussed above with reference to FIG. 5.

In some implementations the modification comprises specifically modifying the audio associated with the pre-generated portion. This may include any playback speed changes or the like as discussed above with reference to the content in a more general manner; the modifications to the audio may also (or instead) include changing an accent or language associated with speech. In some implementations the content modification unit 630 may be configured to perform a dialogue compression process to reduce the amount of dialogue in the pre-generated content. This may be performed in accordance with any of the methods described above, such as those which utilise a machine learning model.

Rather than modifying content to reduce its duration, the content modification unit 630 may be configured to modify the presentation of the pre-generated content by inserting additional pre-generated portions in response to a determination of the level of user focus exceeding a second threshold value (the second threshold value being higher than the threshold value discussed above). Rather than being limited to inserting only additional pre-generated portions, in some cases a machine learning model may be trained so as to enable additional content to be generated that is in keeping with the pre-generated content; for instance, extending a chase sequence by generating new video showing the chase. The content modification unit 630 may also be configured to generate additional dialogue to be inserted into the pre-generated portions, with corresponding video being generated (for instance, using a script to animate characters using a game engine) as appropriate. The generation of additional content in any format may be at least partially informed by the saliency information that may be associated with the content or elements of the content; this can assist in identifying which elements should be present in the newly-generated content, as generating additional content without salient elements may lead to a reduced level of user focus in the case that the newly-generated content appears to be irrelevant to the content.

The arrangement of FIG. 6 is an example of a processor (for example, a GPU and/or CPU located in a games console or any other computing device such as the entertainment device of FIG. 1) that is operable to modifying the presentation of pre-generated content to a user, and in particular is operable to: determine a level of user focus in respect of at least a portion of content being displayed to the user; obtain a user profile indicating one or more characteristics of the user; modify, in response to a determination of the level of user focus falling below a threshold value, the presentation of one or more portions of the pre-generated content to increase the level of user focus, wherein the modification is determined in dependence upon the obtained user profile.

Figure 7:
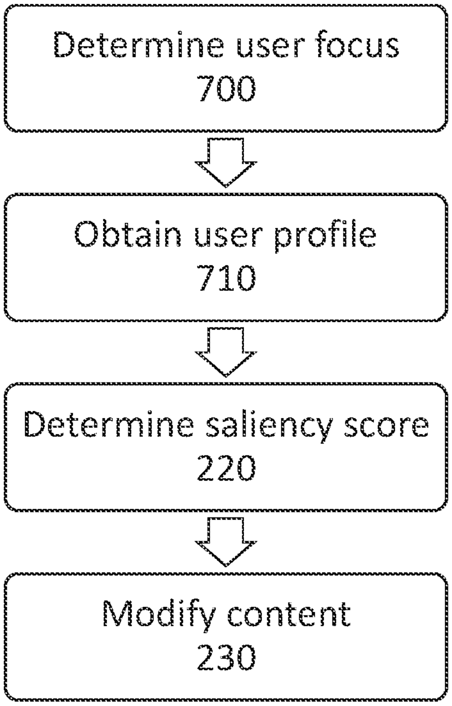
FIG. 7 schematically illustrates a method for modifying the presentation of pre-generated content to a user.

FIG. 7 schematically illustrates a method for modifying the presentation of pre-generated content to a user; this method may be implemented in accordance with any of the features described above.

A step 700 comprises determining a level of user focus in respect of at least a portion of content being displayed to the user.

A step 710 comprises obtaining a user profile indicating one or more characteristics of the user.

An optional step 720 comprises determining a saliency score for one or more frames, elements, scenes, and/or portions of the pre-generated content.

A step 730 comprises modifying, in response to a determination of the level of user focus falling below a threshold value, the presentation of one or more portions of the pre-generated content to increase the level of user focus, wherein the modification is determined in dependence upon the obtained user profile.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for modifying the presentation of pre-generated content to a user, the system comprising: a user focus determination unit configured to determine a level of user focus in respect of at least a portion of content being displayed to the user; a user profile obtaining unit configured to obtain a user profile indicating one or more characteristics of the user; a content modification unit configured to modify, in response to a determination of the level of user focus falling below a threshold value, the presentation of one or more portions of the pre-generated content to increase the level of user focus, wherein the modification is determined in dependence upon the obtained user profile.
2. A system according to clause 1, wherein the modification comprises an increase in the playback speed of the pre-generated portions and/or the editing of a pre-generated portion so as to reduce its duration.
3. A system according to any preceding clause, wherein the modification comprises omitting one or more pre-generated portions during presentation of the content to the user.
4. A system according to any preceding clause, wherein the user focus determination unit is configured to utilise one or more of biometric information, gaze tracking information, motion data, and/or audio inputs corresponding to the user to determine the level of user focus.
5. A system according to any preceding clause, wherein the modification comprises a selection of portions of the pre-generated portions to be presented to the user, wherein the portions include a plurality of portions representing alternatives to one another.
6. A system according to any preceding clause, wherein the modification comprises modifying the audio associated with the pre-generated portion.
7. A system according to clause 6, wherein the modifications to the audio include changing an accent or language associated with speech.
8. A system according to any preceding clause, wherein the content modification unit is configured to perform a dialogue compression process to reduce the amount of dialogue in the pre-generated content.
9. A system according to any preceding clause, comprising a saliency determining unit configured to determine a saliency score for one or more frames, elements, scenes, and/or portions of the pre-generated content.
10. A system according to any preceding clause, wherein the pre-generated content is a cut-scene in a video game.
11. A system according to any preceding clause, wherein the content modification unit is configured to modify the presentation of the pre-generated content by inserting additional pre-generated portions in response to a determination of the level of user focus exceeding a second threshold value.
12. A system according to clause 11, wherein the content modification unit is configured to generate additional dialogue to be inserted into the pre-generated portions.
13. A method for modifying the presentation of pre-generated content to a user, the method comprising: determining a level of user focus in respect of at least a portion of content being displayed to the user; obtaining a user profile indicating one or more characteristics of the user; modifying, in response to a determination of the level of user focus falling below a threshold value, the presentation of one or more portions of the pre-generated content to increase the level of user focus, wherein the modification is determined in dependence upon the obtained user profile.
14. Computer software which, when executed by a computer, causes the computer to carry out the method of clause 13.
15. A non-transitory machine-readable storage medium which stores computer software according to clause 14.

The invention claimed is:

1. A system for modifying a presentation of pre-generated content to a user, the system comprising:

a user focus determination unit configured to determine a level of user focus with respect to at least a portion of content being displayed to the user;

a user profile obtaining unit configured to obtain a user profile indicating one or more characteristics of the user;

a content modification unit configured to modify, in response to a determination of the level of user focus falling below a threshold value, a presentation of one or more portions of the pre-generated content, wherein the content modification unit is configured to determine that modification in dependence upon obtaining the user profile, and wherein the content modification unit is configured to:

identify a subset of the one or more portions of the pre-generated content that are suitable for modification based in part on evaluating a low likelihood of saliency information associated with the pre-generated content being lost relative to the pre-generated content;

and modify the presentation of the one or more portions of the pre-generated content by (1) increasing a playback speed of the subset of the one or more portions and/or editing a portion of the subset of the one or more portions so as to reduce a duration of the portion or (2) omitting a portion of the subset of the one or more portions during the presentation, wherein modification is performed without loss of salient information associated with the one or more portions of the pre-generated content.

2. The system of claim 1, wherein the user focus determination unit is configured to utilise one or more of biometric information, gaze tracking information, motion data, and/or audio inputs corresponding to the user to determine the level of user focus.

3. The system of claim 1, wherein the content modification unit is configured to select portions of the pre-generated portions to be presented to the user, wherein the portions include a plurality of portions representing alternatives to one another.

4. The system of claim 1, wherein the content modification unit is configured to modify audio associated with the pre-generated portion.

5. The system of claim 4, wherein modifying the audio includes changing an accent or language associated with speech.

6. The system of claim 1, wherein the content modification unit is configured to perform a dialogue compression process to reduce an amount of dialogue in the pre-generated content.

7. The system of claim 1, comprising a saliency determining unit configured to determine a saliency score for one or more frames, elements, scenes, and/or portions of the pre-generated content associated with the saliency information.

8. The system of claim 1, wherein the pre-generated content is a cut-scene in a video game.

9. The system of claim 1, wherein the content modification unit is configured to modify the presentation of the pre-generated content by inserting additional pre-generated portions in response to a determination of the level of user focus exceeding a second threshold value.

10. The system of claim 9, wherein the content modification unit is configured to generate additional dialogue to be inserted into the pre-generated portions.

11. A method for modifying a presentation of pre-generated content to a user, the method comprising:

determining a level of user focus with respect to at least a portion of content being displayed to the user;

obtaining a user profile indicating one or more characteristics of the user;

modifying, in response to a determination of the level of user focus falling below a threshold value, a presentation of one or more portions of the pre-generated content, wherein the modifying depends upon obtaining the user profile, and wherein the modifying includes:

identifying a subset of the one or more portions of the pre-generated content that are suitable for modification based in part on evaluating a low likelihood of saliency information associated with the pre-generated content being lost relative to the pre-generated content;

and modifying the presentation of the one or more portions of the pre-generated content by (1) increasing a playback speed of the subset of the one or more portions and/or editing a portion of the subset of the one or more portions so as to reduce a duration of the portion or (2) omitting a portion of the subset of the one or more portions during the presentation.

12. A non-transitory machine-readable storage medium which stores computer software which, when executed by a computer, causes the computer to perform a method for modifying a presentation of pre-generated content to a user, the method comprising:

determining a level of user focus with respect to at least a portion of content being displayed to the user;

obtaining a user profile indicating one or more characteristics of the user;

modifying, in response to a determination of the level of user focus falling below a threshold value, a presentation of one or more portions of the pre-generated content, wherein the modifying depends upon obtaining the user profile, and wherein the modifying includes:

identifying a subset of the one or more portions of the pre-generated content that are suitable for modification based in part on evaluating a low likelihood of saliency information associated with the pre-generated content being lost relative to the pre-generated content;

and modifying the presentation of the one or more portions of the pre-generated content by (1) increasing a playback speed of the subset of the one or more portions and/or editing a portion of the subset of the one or more portions so as to reduce a duration of the portion or (2) omitting a portion of the subset of the one or more portions during the presentation.

* * * * *